United States Patent Office 3,846,182
Patented Nov. 5, 1974

3,846,182
METHOD OF FORMING A HYDROPHILIC COATING OVER AN ALUMINUM SURFACE
John C. Huff, Detroit, Frank A. Ludwig, Farmington, and Arthur G. Smith, Livonia, Mich., assignors to Ford Motor Company, Dearborn, Mich.
No Drawing. Filed July 5, 1973, Ser. No. 376,763
Int. Cl. C23f 7/26
U.S. Cl. 148—6.2
6 Claims

ABSTRACT OF THE DISCLOSURE

A method is taught for forming a continuous, rough, porous hydrophilic coating over an aluminum surface. The method includes preparing the aluminum surface to be treated. The surface is first coated by immersing it for a period of time in a first aqueous solution containing both an alkali metal carbonate and an alkali metal chromate or dichromate while the solution is maintained at a temperature in the range of from 170° F. to 210° F. The chromium to carbonate ratio of the first solution is maintained in a range from 0.05 to 0.5 during the treatment of the surface. The aluminum surface is next coated by immersing it for a period of 2 to 20 minutes in a second aqueous solution containing both an alkali metal oxide and silicon dioxide while the second solution is maintained at a temperature in the range of from 160° F. to 210° F. The alkali metal oxide to silicon dioxide ratio is maintained in a range from 1:1.5 to 2:1 during the treatment of the surface.

BACKGROUND OF THE INVENTION

In a heat transfer device, such as an evaporator used in an automotive air conditioning system, heat is transferred from a gas stream to a heat transfer fluid to cool the gas stream. With respect to the operation of the evaporator, the cooling of the gas stream as it passes through a plurality of small passages in the evaporator results in the condensation of water within the passages. This water tends to plug the small passages. Such plugging increases the power required from a blower motor to blow the gas stream through the passages because of the added work in pushing the water out of such passages.

It has also been found that use of most evaporators over a period of years increases the resistance of the evaporator's passages to the movement of water therethrough. Thus, as the evaporator is used, its effectiveness from a thermal standpoint decreases. This effectiveness decrease comes about from the fact that the power of the blower motor associated therewith does not increase and less water is removed from the evaporator as the resistance to water flow through its passages increases. Since less passages are unplugged, less heat transfer area is available. In addition, the increased resistance to air flow offered by the evaporator results in a reduced air flow causing poorer air circulation within the vehicle.

It is an object of this invention to provide a method for developing an aluminum surface having an extremely high degree of water shedability, which ability to shed water does not deteriorate substantially over prolonged periods of time. It is another object of this invention to provide a method of forming a water shedable coating on an aluminum surface after the aluminum has been formed into complex shapes or configurations such as required in the formation of an evaporator for an air conditioning system.

SUMMARY OF THE INVENTION

This invention relates to a method of forming a continuous, rough, porous, hydrophilic coating over an aluminum surface and, more particularly, to a method of forming such a coating over an aluminum surface which provides almost instantaneous removal from the surface of water droplets by a wicking action, which action is associated with a rough surface having a contact angle of zero degrees.

In accordance with the broad teachings of the method of this invention, a continuous, rough, porous, hydrophilic coating over an aluminum surface is formed on an aluminum surface which has been precleaned in one of the many well known ways. The generic methodology taught herein produces a surface on an aluminum article which has, for all practical purposes, a zero degree contact angle for a water drop placed thereupon. The meaning of zero contact angle is well known in the art. It may be described briefly by the way it manifests itself on a rough surface. A 0.05 milliliter drop of pure water will spread to a diameter of at least 20 millimeters in a few seconds on such a surface. Such a surface is best described as one in which water is rapidly moved along the surface of the rough, porous, hydrophilic coating by a spontaneous wicking action. The extent of spread of a drop of water is limited by the volume retention within the coating and by evaporation. For comparative data, tests should be made at constant temperature and relative humidity, for instance at 75° F. and 50% relative humidity.

In accordance with the generic teachings of this method, a clean aluminum surface is coated by immersing it for a period of from 3 to 20 minutes in a first aqueous solution containing both an alkali metal carbonate and an alkali metal chromate or dichromate. The first solution is maintained at a temperature in the range of from 170° to 210° F. The chromium to carbonate ratio in the first solution must be maintained in a range from 0.05 to 0.5 during treatment of the surface. The criticalness of this ratio will be explained in detail below.

After coating the surface in the first solution, the surface is coated again by immersing it for a period of 2 to 20 minutes in a second aqueous solution containing both an alkali metal oxide and silicon dioxide. This second solution is maintained at a temperature in the range of from 160° F. to 210° F. The alkali metal oxide to silicon dioxide ratio in the second solution is maintained in a range from 1:1.5 to 2:1 during treatment of the surface. The critical nature of this ratio will also be explained below.

Once the surface has been treated as above described and allowed to dry, it will have a protective coating thereon which is rough, porous, continuous and hydrophilic. The coating will have an effective contact angle of zero degrees and will shed rapidly any water coming in contact therewith.

DESCRIPTION OF THE PREFERRED EMBODIMENT

The method of this invention is generic in that it may be utilized in treating surfaces formed of aluminum or aluminum alloys, all hereinafter referred to as aluminum. Treatment of these materials in accordance with the method described below, whether such materials are in sheet form or are fabricated into articles of complex configuration, will result in the materials having a water shedable coating thereon.

As above described, the method of this invention generally teaches the treatment of an aluminum surface in two different solutions, which two solutions are maintained as specific temperatures and which contain specific ratio of active materials. Each of the solutions is only generally known in the prior art. However, the solutions are not known, prior to this invention for use either alone or in conjunction with one another to produce a rough, porous, hydrophilic coating for an aluminum surface, which coating effectively has a zero contact angle for water. The first coating to be described is known in the prior art as a pretreatment for aluminum parts which are usually to be painted or dyed. The treatment by the first solution alone does not produce a coating which will retain its hydrophilic nature for more than a few days. The chromate contained in the first solution makes the surface somewhat hydrophobic as chromium is incorporated into the coating as oxide. The second solution utilized in this method is also similar to solutions known in the prior art. However, the second solution employed has ratios of active materials substantially different than that known in the prior art. The ratio of active materials employed is critical to the method of the invention as will be explained below.

Pretreatment

Prior to initiation of the method of the invention, the aluminum surface to be treated generally should be cleaned. Several alternatives may be utilized to do this as the primary objective of the pretreatment is to assure a clean, deoxidized surface.

One pretreatment may be based upon immersion of the surface for one minute in an aqueous solution containing 2% $Na_2CO_3$ and 1% $Na_3PO_4$ at 160° F. followed by a water rinse. A second pretreatment is to immerse the surface for one minute in a 1% sodium hydroxide aqueous solution at 160° F, then rinse the surface. Another alternative is to immerse the surface for 1 minute at ambient temperature in an aqueous solution containing 100 milliliters concentrated $H_2SO_4$ and 40 milliliters of 48% HF per liter, followed by a rinse. Another alternative is to immerse the surface for 1 minute in a strong alkali etchant agent with inhibitors and bath extenders, followed by a rinse.

Step 1

The clean aluminum surface is immersed in a first solution. This first solution is of the "MBV" type first developed by Bauer and Vogel in 1915. This treatment did not become commercially practical until 1930 when Eckert introduced modifications thereto to produce the MBV treatment. This treatment uses solutions of an alkali metal carbonate, preferably of sodium or potassium, and an alkali metal chromate or dichromate, preferably of sodium or potassium. The properties of the bath are a function of the chromium to carbonate ratio which will be discussed below.

The first solution is generally maintained at a temperature in the range from 170° F. to 210° F. during treatment of the surface. In general, the first solution contains 0.5 to 5.0% and preferably 2–3% by weight of the alkali metal carbonate and sufficient of the alkali metal chromate or dichromate to achieve the maintenance of the proper ratio of chromium to carbonate. In preferred opeation, the bath is operated at a temperature of 200° F. plus or minus 5° F.

It must be first stated that one skilled in the art would not select this MBV type treatment if he was intending to achieve a hydrophilic coating. The reason one would not use this MBV treatment is that the use of chromate results in the formation of hydrophobic chromium oxides admixed with hydrophilic aluminum oxides and when employed in forming a surface film it produces a coating which does not have adequate water shedding characteristics. Also one skilled in the art, in attempting to produce a water shedding coating on an aluminum surface, would try to produce such a coating in a one step process. The desirability of a one step process is of course apparent as it greatly reduces the time and expense of developing the desired surface. However, it has been found by us that a two step process, which although more costly, will produce the desired characteristics far superior to any known one step process.

As stated previously, we have found a critical range for the maintenance of the chromium to carbonate ratio in the first solution. This range of maintenance of this ratio of chromium to carbonate is from 0.05 to 0.5 during the treatment of the surface. The preferred range of this ratio is about 0.15 to 0.25. It is of course to be understood that less desirable characteristics are achieved with the maintenance of the chromium to carbonate ratio at the outer limits of the ratio than that achieved at the preferred limits. However, the outer limits are placed to indicate the breath of the invention. We realize that if one operates at the extreme ends of the limits specified herein they will not achieve as good a coating as can be achieved by operating within the preferred limits of composition and temperature.

The purpose of the MBV coating is to put down a rough and porous surface. Also, we have found that by maintaining the limits of chromium to carbonate ratio as set forth above, the coating put down is one which will accept readily the second coating to follow. In other words, the criticalness of the ratio maintenance in the first solution is not required because of the manner in which that solution reacts with the aluminum surface, but rather, the criticality of the ratio is one which is associated with the manner in which the second solution will co-act with the deposit formed by the first solution. Therefore, the primary purpose of the first solution is to develop a rough, porous and adherent surface on the aluminum material. This rough and porous surface also is critical in that it must be developed with specific ratios of the materials in the solution so that the surface will accept thereon coatings from the second solution. We have found that if the ratios are not maintained as described above the second solution will be deposited improperly because of excessive or inadequate roughness and/or porosity resulting in, in both cases, too little reaction with and deposit from the second solution.

With respect to the temperatures specified for the first coating solution, we have found that the range specified is one which gives good results throughout almost its entire extent but which gives less desirable results near the extremes thereof. For example, the use of the solution at or near the 170° F. mark generally has a tendency to produce a surface which is too tight for proper application of the second coating solution. Similarly, the coatings at the higher temperature of 210° F. are generally too loose and powdery. The preferred temperature of application is approximately 200° F. plus or minus 5° F.

After the material has been treated with the first solution, it is rinsed and is then ready for the second solution. The deposit from the first solution should not be allowed to dry or to be baked as this alters the effectiveness of it for accepting and co-reacting with the second solution.

Step 2

The second solution to be placed on the aluminum surface treated by the first solution is a silicate solution This type of coating solution is described in U.S. Pat. No. 1,946,153 and has many known ramifications. Once again, while this general type of silicating step is known in the prior art, the specific operating details as to be described herein in order to achieve an operable process has not been disclosed in the prior art. For example, the cited U.S. Patent teaches ratios of material which are substantially different than that utilized by us in our methodology.

In the second coating step, the aluminum surface, which has been treated by the first solution, is immersed in a second solution for a period of from 2 to 20 minutes. The second solution contains both an alkali metal oxide and silicon dioxide. Preferably, the alkali metal oxide is formed of sodium or potassium and is present in an amount of .5 to 2.5% by weight. In general, sodium metasilicate is utilized which has a $Na_2O:SiO_2$ ratio of 1:1. We have found that the alkali metal oxide to silicon dioxide ratio can be maintained in the second solution in a range from 1:1.5 to 2:1 during treatment of the surface in the second solution. Once again, it should be pointed out that the ratio set forth above is one in which the best results are achieved when one is operating at a ratio of approximately 1:1 to 1.5:1. More undesirable results are achieved at the outer limits of the ratio indicated above. For example, at a ratio of 2:1, the solution of which is attained by mixing proper proportions of sodium hydroxide and sodium metasilicate, is slightly too vigorously reactive and the previous MBV coating laid down to some extent tends to be undermined and dislodged as excessive hydrogen gas is evolved.

It may be seen above that the preferred compositions are generally alkaline in nature. It is easy to see that this is substantially different than the preferred materials set forth in the mentioned U.S. Patent. The reason for the maintenance of the alkaline solution is the fact that it is being used to coat a surface which has already been treated with MBV coating. If the material was used in this form against an aluminum surface without the MBV teratment, a commercially acceptable coating is not obtained on the aluminum surface. However, seeing as how the aluminum surface, in this method, has been pretreated by the MBV coating, the use of the alkaline solution second step is effective to place a proper second coating over the MBV coating.

The second coating placed over the MBV coating masks all of the hydrophobic tendencies of the MBV coating and produces an extremely hydrophilic surface. The hydrophilic surface has a contact angle substantially equal to zero degrees because of two principle reasons. One reason is the porosity of the surface produced by the MBV coating and the second reason is the rough and porous hydrophilic coating placed over the porous material by the silicate treatment. The combination of the process coating and the hydrophilic characteristics of the silicate coating produces an extremely hydrophilic coating on the aluminum which has an effective contact angle of zero degrees and results in spontaneous wicking action for water removal.

The coating weight of MBV and silicate should be in the range of 500 to 1000 milligrams per square foot. This coating weight per square foot is desired to provide sufficient coating that the surface will be one that will have the desirable water-shedding characteristics over a prolonged time period.

In summation, it may be stated that the aluminum is treated by the method of this invention to develop a highly desirable water-shedding coating thereon. The coating is developed in a method employing two principal coating steps in which the article is first immersed in a MBV coating having a certain critical ratio of principal materials in order to develop the proper roughness and porosity characteristics for the material. The roughened, porous surface is subsequently treated in a silicate solution of required principal material ratio in order to deposit a second coating over the first coating. The combination of the first and second coatings produces a highly desirable rough and hydrophilic surface which has a contact angle of effectively zero degrees.

In view of the specification above, those skilled in the art will be capable of formulating many modifications which fall within the true spirit and scope of this invention. It is intended that all such modifications fall within the scope of the appended claims.

We claim:
1. A method of forming a continuous, rough, porous and hydrophilic coating over a generally clean aluminum surface which comprises the steps of:

coating the aluminum surface by immersing it for a period of from 5 to 20 minutes in a first solution containing both an alkali metal carbonate and an alkali metal chromate or dichromate;

maintain said first solution at a temperature in the range of 170° F. to 210° F.;

maintaining the chromium to carbonate ratio of said first solution in a range from 0.05 to 0.5 during the treatment of said surface;

coating the aluminum surface treated by said first solution by immersing it for a period of 2 to 20 minutes in a second solution containing both an alkali metal oxide and silicon dioxide;

maintaining said second solution at a temperature in the range of from 160° F. to 210° F.; and maintaining an alkali metal oxide to silicon dioxide ratio in said second solution in a range from 1:1.5 to 2:1 during treatment of said surface.

2. The method of Claim 1 wherein: said alkali metal carbonate, said alkali metal chromate or dichromate and said alkali metal oxide are selected from the group of sodium or potassium salts.

3. The method of Claim 1 wherein said first solution contains 2–3% by weight of said alakali metal carbonate and sufficient of said alkali metal chromate or dichromate to achieve the maintenance of the proper ratio of chromium to carbonate.

4. The method of Claim 3 wherein said first solution is maintained at a temperature of 200° F. plus or minus 5° F.

5. The method of Claim 1 wherein said second solution contains .5 to 2.5% by weight of said alkali metal oxide and sufficient of said silicon dioxide to achieve the maintenance of said second solutions ratio.

6. The method of Claim 5 wherein said second solution is maintained at a temperature of 200° F. plus or minus 5° F.

References Cited
UNITED STATES PATENTS

| | | | |
|---|---|---|---|
| 1,946,153 | 2/1934 | Edwards | 148—6.2 |
| 2,520,475 | 8/1950 | Sonnino | 148—6.2 |
| 2,714,066 | 7/1955 | Jewett et al. | 117—135.1 X |
| 3,551,183 | 12/1970 | Vondracek et al. | 117—135.1 X |
| 3,565,675 | 2/1971 | Sams | 117—135.1 X |

OTHER REFERENCES

Wernick et al., Metal Finishing, August 1956, pp. 57, 58.

RALPH S. KENDALL, Primary Examiner

U.S. Cl. X.R.

117—135.1